United States Patent
Matsumura et al.

(10) Patent No.: US 11,777,588 B2
(45) Date of Patent: Oct. 3, 2023

(54) TERMINAL, RADIO COMMUNICATION METHOD, AND SYSTEM

(71) Applicant: NTT DOCOMO, INC., Tokyo (JP)

(72) Inventors: Yuki Matsumura, Tokyo (JP); Satoshi Nagata, Tokyo (JP); Jing Wang, Beijing (CN); Xiaolin Hou, Beijing (CN)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 18/146,781

(22) Filed: Dec. 27, 2022

(65) Prior Publication Data
US 2023/0139074 A1  May 4, 2023

Related U.S. Application Data

(63) Continuation of application No. 17/265,398, filed as application No. PCT/JP2018/029314 on Aug. 3, 2018, now abandoned.

(51) Int. Cl.
*H04B 7/08* (2006.01)
*H04B 17/318* (2015.01)
(Continued)

(52) U.S. Cl.
CPC .......... *H04B 7/088* (2013.01); *H04B 7/0626* (2013.01); *H04B 17/318* (2015.01); *H04B 17/336* (2015.01); *H04W 24/10* (2013.01)

(58) Field of Classification Search
CPC .... H04B 7/088; H04B 7/0626; H04B 17/318; H04B 17/336; H04B 7/0695; H04W 24/10
See application file for complete search history.

(56) References Cited

U.S. PATENT DOCUMENTS

2018/0227031 A1  8/2018  Guo
2019/0037426 A1  1/2019  Yu
(Continued)

FOREIGN PATENT DOCUMENTS

WO  2017159259     9/2017
WO  2017159259 A1  9/2017

OTHER PUBLICATIONS

3GPP TS 36.300 V8.12.0; "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8)"; Mar. 2010 (149 pages).
(Continued)

*Primary Examiner* — Fred A Casca
(74) *Attorney, Agent, or Firm* — Osha Bergman Watanabe & Burton LLP

(57) ABSTRACT

A terminal is disclosed that includes a receiver that receives Channel State Information (CSI) reporting configuration information which is a Radio Resource Control (RRC) information element. The terminal also includes a processor that ignores a second RRC parameter regarding report quantity when the terminal is configured with a first RRC parameter regarding report quantity by the CSI reporting configuration information. The processor also performs a control to report Layer 1 Signal to Interference plus Noise Ratio (L1-SINR) when quantity for reporting L1-SINR is indicated by the first RRC parameter. In other aspects, a radio communication method and a system are also disclosed.

3 Claims, 12 Drawing Sheets

(51) Int. Cl.
*H04B 17/336* (2015.01)
*H04B 7/06* (2006.01)
*H04W 24/10* (2009.01)

(56) References Cited

U.S. PATENT DOCUMENTS

| | | | |
|---|---|---|---|
| 2020/0169902 A1 | 5/2020 | Yasukawa | |
| 2021/0100040 A1* | 4/2021 | Bhardwaj | ............... H04L 1/18 |
| 2021/0112433 A1* | 4/2021 | Ryu | .................. H04W 24/10 |

OTHER PUBLICATIONS

3GPP TSG-RAN WG1 Meeting #93; R1-1807782 "Feature lead summary 3 for beam measurement and reporting" Ericsson; Busan; May 21-25, 2018 (43 pages).
International Search Report issued in International Application No. PCT/JP2018/029314, dated Oct. 30, 2018 (5 pages).
Written Opinion issued in International Application No. PCT/JP2018/029314; dated Oct. 30, 2018 (3 pages).
Extended European Search Report issued on Application No. 18928953.1 dated Feb. 21, 2022 (10 pages).
ZTE, "Discussion on beam recovery mechanism" 3GPP TSG RAN WG1 NR Ad-Hoc#2, R1-1710185, Qingdao, P.R. China, Jun. 27-30, 2017 (9 pages).
Nokia, Nokia Shanghai Bell, "Joint L1-RSRP Beam Reporting for SSB and CSI-RS", 3GPP TSG RAN WG1 Meeting #93, R1-1807193, Busan, Korea, May 21-25, 2018 (3 pages).
Ericsson, "Draft Update to Flag for Beam ID reporting (Issue S005)", 3GPP TSG-RAN WG2 NR AH#3, Tdoc Draft, R2-1801646, Vancouver, Canada, Jan. 22-26, 2018 (3 pages).

* cited by examiner

```
CSI-ReportConfig ::=                    SEQUENCE {
    reportConfigId                          CSI-ReportConfigId,
    carrier                                 ServCellIndex                   OPTIONAL, -- Need S
    resourcesForChannelMeasurement          CSI-ResourceConfigId,
    csi-IM-ResourcesForInterference         CSI-ResourceConfigId            OPTIONAL, -- Need R
    nzp-CSI-RS-ResourcesForInterference     CSI-ResourceConfigId            OPTIONAL, -- Need R
    ...
    reportQuantity                          CHOICE {
        none                                    NULL,
        cri-RI-PMI-CQI                          NULL,
        cri-RI-i1                               NULL,
        cri-RI-i1-CQI                           SEQUENCE {
            pdsch-BundleSizeForCSI                  ENUMERATED {n2, n4}         OPTIONAL
        },
        cri-RI-CQI                              NULL,
        cri-RSRP                                NULL,
        ssb-Index-RSRP                          NULL,
        cri-RI-LI-PMI-CQI                       NULL
    },
    ...
    groupBasedBeamReporting                 CHOICE {
        enabled                                 NULL,
        disabled                                SEQUENCE {
            nrofReportedRS                          ENUMERATED {n1, n2, n3, n4}  OPTIONAL -- Need S
        }
    },
    ...
}
```

```
beamselectioncriteria         CHOICE {
    L1-RSRP                       NULL,
    L1-RSRQ                       NULL,
    L1-SINR                       NULL,
    L1-RSRP-RSRQ                  NULL,
    L1-RSRP-SINR                  NULL,
},
```

FIG. 2B

```
beamselectioncriteria         SEQUENCE {
    L1-RSRP                       NULL            OPTIONAL,
    L1-RSRQ                       NULL            OPTIONAL,
    L1-SINR                       NULL            OPTIONAL,
},
```

FIG. 3A

```
beamselectioncriteria          CHOICE {
    csi-RSRP                       NULL,
    ssb-RSRP                       NULL,
    csi-RSRQ                       NULL,
    ssb-RSRQ                       NULL,
    csi-SINR                       NULL,
    ssb-SINR                       NULL,
    csi-RSRP-RSRQ                  NULL,
    ssb-RSRP-RSRQ                  NULL,
    csi-RSRP-SINR                  NULL,
    ssb-RSRP-SINR                  NULL,
},
```

FIG. 3B

```
beamselectioncriteria          SEQUENCE {
    csi-RSRP                       NULL          OPTIONAL,
    ssb-RSRP                       NULL          OPTIONAL,
    csi-RSRQ                       NULL          OPTIONAL,
    ssb-RSRQ                       NULL          OPTIONAL,
    csi-SINR                       NULL          OPTIONAL,
    ssb-SINR                       NULL          OPTIONAL,
},
```

| L1-RSRP | | TX beam 1 | TX beam 2 | TX beam 3 | TX beam 4 | TX beam 5 | TX beam 6 | TX beam 7 | TX beam 8 |
|---|---|---|---|---|---|---|---|---|---|
| UE: TXRU 1 | Rx beam 1 | -58 | -59 | -68 | -56 | -61 | -82 | -62 | -80 |
| | Rx beam 2 | -63 | -62 | -66 | -61 | -60 | -72 | -70 | -80 |

| L1-RSRQ | | TX beam 1 | TX beam 2 | TX beam 3 | TX beam 4 | TX beam 5 | TX beam 6 | TX beam 7 | TX beam 8 |
|---|---|---|---|---|---|---|---|---|---|
| UE: TXRU 1 | Rx beam 1 | 30 | 27 | | 28 | 28 | | | |
| | Rx beam 2 | | | | | | | | |

FIG. 4

```
reportQuantity              CHOICE {
    none                        NULL,
    cri-RI-PMI-CQI              NULL,
    cri-RI-i1                   NULL,
    cri-RI-i1-CQI               SEQUENCE {
        pdsch-BundleSizeForCSI      ENUMERATED {n2, n4}   OPTIONAL
    },
    cri-RI-CQI                  NULL,
    cri-RSRP                    NULL,
    ssb-Index-RSRP              NULL,
    cri-RI-LI-PMI-CQI           NULL,
    cri-RSRQ                    NULL,
    cri-SINR                    NULL,
    ssb-index-RSRQ              NULL,
    ssb-index-SINR              NULL,
    cri-RSRP-RSRQ               NULL,
    cri-RSRP-SINR               NULL,
    ssb-index-RSRP-RSRQ         NULL,
    ssb-index-RSRP-SINR         NULL
},
```

FIG. 5

```
reportQuantity           CHOICE {
    none                     NULL,
    cri-RI-PMI-CQI           NULL,
    ...
    cri-RSRP                 NULL,
    ssb-Index-RSRP           NULL,
    cri-RI-LI-PMI-CQI        NULL
},
reportQuantity-r16       CHOICE {
    none                     NULL,
    cri-RI-PMI-CQI           NULL,
    cri-RI-i1                NULL,
    cri-RI-i1-CQI            SEQUENCE {
        pdsch-BundleSizeForCSI   ENUMERATED {n2, n4}     OPTIONAL
    },
    cri-RI-CQI               NULL,
    cri-RSRP                 NULL,
    ssb-Index-RSRP           NULL,
    cri-RI-LI-PMI-CQI        NULL,
    cri-RSRQ                 NULL,
    cri-SINR                 NULL,
    ssb-Index-RSRQ           NULL,
    ssb-Index-SINR           NULL,
    cri-RSRP-RSRQ            NULL,
    cri-RSRP-SINR            NULL,
    ssb-Index-RSRP-RSRQ      NULL,
    ssb-Index-RSRP-SINR      NULL
},
```

FIG. 6

TERMINAL, RADIO COMMUNICATION METHOD, AND SYSTEM

CROSS-REFERENCE TO RELATED APPLICATIONS

This application is a continuation application and, thereby, claims benefit under 35 U.S.C. § 120 to U.S. patent application Ser. No. 17/265,398, filed on Feb. 2, 2021, titled "USER TERMINAL AND RADIO COMMUNICATION METHOD," which is a national stage application of PCT Application No. PCT/JP2018/029314, filed on Aug. 3, 2018. The contents of these applications are incorporated by reference in their entirety.

TECHNICAL FIELD

The present disclosure relates to a user terminal and a radio communication method of a next-generation mobile communication system.

BACKGROUND ART

In Universal Mobile Telecommunications System (UMTS) networks, for the purpose of higher data rates and lower latency, Long Term Evolution (LTE) has been specified (Non-Patent Literature 1). Furthermore, for the purpose of a larger capacity and higher sophistication than those of LTE (LTE Rel. 8 and 9), LTE-Advanced (LTE-A and LTE Rel. 10, 11, 12 and 13) has been specified.

LTE successor systems (also referred to as, for example, Future Radio Access (FRA), the 5th generation mobile communication system (5G), 5G+ (plus), New Radio (NR), New radio access (NX), Future generation radio access (FX) or LTE Rel. 14, 15 or subsequent releases) are also studied.

In legacy LTE systems (e.g., LTE Rel. 8 to 13), a user terminal (UE: User Equipment) periodically and/or aperiodically transmits Channel State Information (CSI) to a base station. The UE transmits the CSI by using an uplink control channel (PUCCH: Physical Uplink Control Channel) and/or an uplink shared channel (PUSCH: Physical Uplink Shared Channel).

CITATION LIST

Non-Patent Literature

Non-Patent Literature 1: 3GPP TS 36.300 V8.12.0 "Evolved Universal Terrestrial Radio Access (E-UTRA) and Evolved Universal Terrestrial Radio Access Network (E-UTRAN); Overall description; Stage 2 (Release 8)", April 2010

SUMMARY OF INVENTION

Technical Problem

A Beam Management (BM) method has been studied for a future radio communication system (e.g., NR). According to this beam management, it is studied to perform beam selection based on L1-RSRP (Reference Signal Received Power (RSRP) in a physical layer (layer 1)) reported by a UE.

Furthermore, it is also studied to use a beam measurement result (such as interference measurement) other than the L1-RSRP. However, study on a specific notification method for the UE for this new beam selection/reporting does not advance yet. When this selection/reporting cannot be performed, it is not possible to appropriately perform beam selection, and there is a risk that a communication throughput lowers.

It is therefore one of objects of the present disclosure to provide a user terminal and a radio communication method that can appropriately select a beam and report the beam.

Solution to Problem

A user terminal according to one aspect of the present disclosure includes: a reception section that receives information related to a beam selection index; and a control section that selects a beam based on an index indicated by the information.

Advantageous Effects of Invention

According to one aspect of the present disclosure, it is possible to appropriately select a beam and report the beam.

BRIEF DESCRIPTION OF DRAWINGS

FIG. 1 illustrates an excerpt of an RRC information element "CSI-ReportConfig".

FIGS. 2A and 2B are diagrams illustrating one example of an RRC parameter that indicates index information.

FIGS. 3A and 3B are diagrams illustrating another example of the RRC parameter that indicates the index information.

FIG. 4 is a diagram illustrating one example of beam selection.

FIG. 5 is a diagram illustrating one example of a report quantity for reporting at least one of RSRP and an SINR.

FIG. 6 is a diagram illustrating another example of the report quantity for reporting at least one of the RSRP and the SINR.

DESCRIPTION OF EMBODIMENTS

Figure 7:
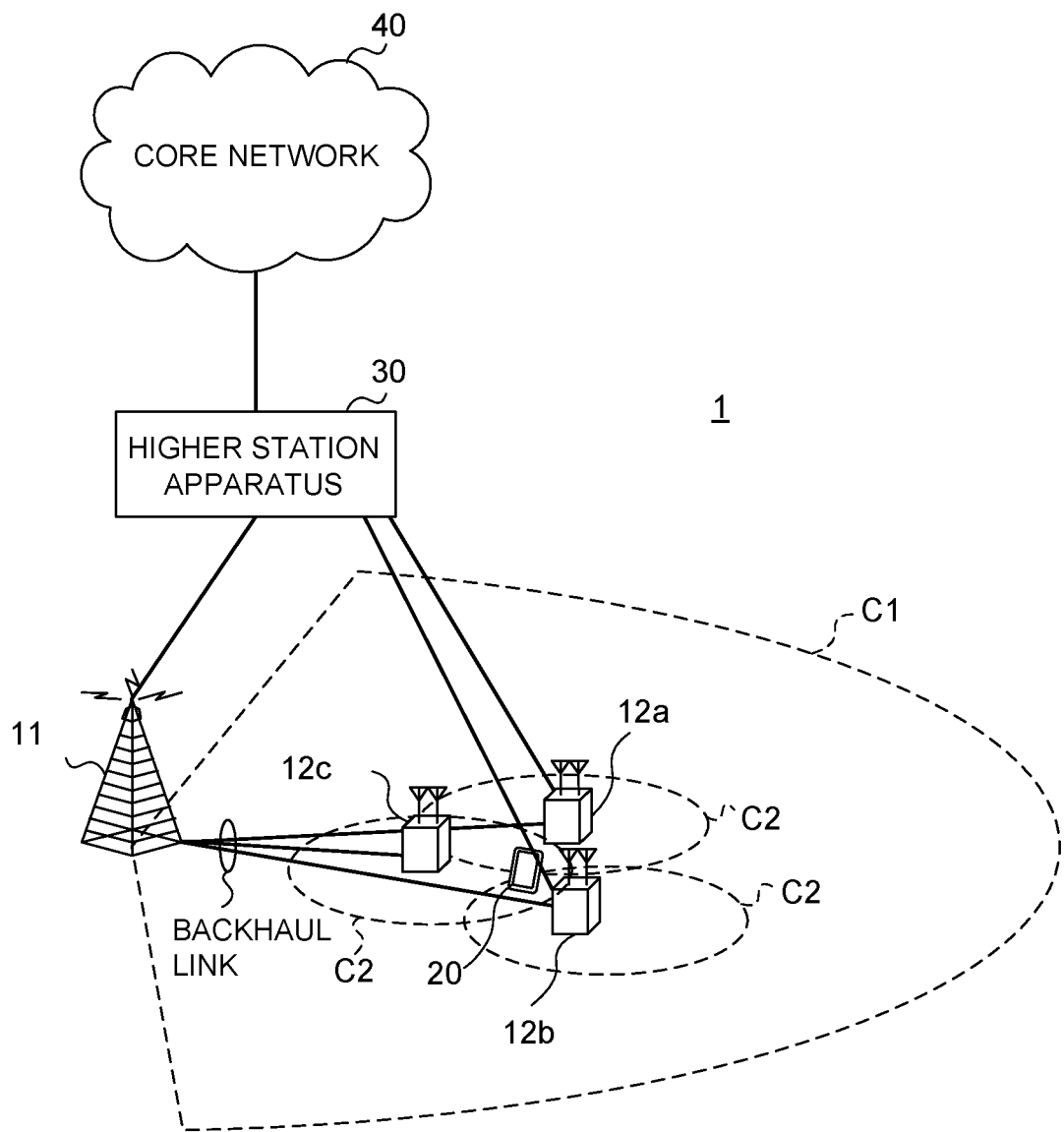
FIG. 7 is a diagram illustrating one example of a schematic configuration of a radio communication system according to one embodiment.

According to NR, a UE measures a channel state by using a given reference signal (or a resource for the given reference signal), and feeds back (reports) Channel State Information (CSI) to a base station.

The UE may measure the channel state by using a Channel State Information Reference Signal (CSI-RS), a Synchronization Signal/Physical Broadcast Channel (SS/PBCH) block, a Synchronization Signal (SS) or a DeModulation Reference Signal (DMRS).

The CSI-RS resource may include at least one of a Non Zero Power (NZP) CSI-RS and CSI-Interference Management (IM). The SS/PBCH block is a block that includes a synchronization signal (e.g., a Primary Synchronization Signal (PSS) or a Secondary Synchronization Signal (SSS)) and a PBCH (and a corresponding DMRS), and may be referred to as an SS Block (SSB).

In addition, the CSI may include at least one of a Channel Quality Indicator (CQI), a Precoding Matrix Indicator (PMI), a CSI-RS Resource Indicator (CRI), an SS/PBCH Block Resource Indicator (SSBRI), a Layer Indicator (LI), a Rank Indicator (RI), Layer 1 Reference Signal Received Power (L1-RSRP), L1-Reference Signal Received Quality (RSRQ), an L1-Signal to Interference plus Noise Ratio (SINR), and an L1-Signal to Noise Ratio (SNR).

The CSI may include a plurality of parts. A first part (CSI part 1) of the CSI may include information (e.g., RI) of a relatively small number of bits. A second part (CSI part 2) of the CSI may include information (e.g., CQI) of a relatively large number of bits such as information determined based on the CSI part 1.

As a CSI feedback method, (1) a Periodic CSI (P-CSI) reporting, (2) an Aperiodic CSI (A-CSI) reporting and (3) a Semi-Permanent (semi-continuous or Semi-Persistent) CSI reporting (SP-CSI) are studied.

The UE may be notified of information (that may be referred to as CSI reporting configuration information) related to a CSI reporting by using a higher layer signaling, a physical layer signaling (e.g., Downlink Control Information (DCI)) or a combination of these signalings. The CSI reporting configuration information may be configured by using, for example, an RRC information element "CSI-ReportConfig".

In this regard, the higher layer signaling may be one or a combination of, for example, a Radio Resource Control (RRC) signaling, a Medium Access Control (MAC) signaling and broadcast information.

The MAC signaling may use, for example, an MAC Control Element (MAC CE) or an MAC Protocol Data Unit (PDU). The broadcast information may be, for example, a Master Information Block (MIB), a System Information Block (SIB), Remaining Minimum System Information (RMSI), or Other System Information (OSI).

CSI reporting configuration information may include, for example, information related to a report periodicity and an offset, and these given periodicity and offset may be expressed in a given time unit (such as a slot unit, a subframe unit or a symbol unit). The CSI reporting configuration information may include a configuration ID (CSI-ReportConfigId), and parameters such as a CSI reporting method type (SP-CSI or not) and the report periodicity may be specified based on the configuration ID. The CSI reporting configuration information may include information (CSI-ResourceConfigId) that indicates which CSI measured by using which signal (or a resource for which signal) to report.

(Beam Management)

A Beam Management (BM) method has been studied for Rel-15 NR so far. It is studied for the beam management to perform beam selection based on L1-RSRP reported by the UE. Changing (switching) a beam of a certain signal/channel may correspond to changing a Transmission Configuration Indication state (TCI state) of the certain signal/channel.

In addition, a beam selected by beam selection may be a transmission beam (Tx beam), or may be a reception beam (Rx beam). Furthermore, the beam selected by beam selection may be a beam of the UE, or may be a beam of the base station.

The UE may report (transmit) a measurement result for beam management by using a PUCCH or a PUSCH. The measurement result may be CSI including at least one of L1-RSRP, L1-RSRQ, an L1-SINR and an L1-SNR. Furthermore, the measurement result may be referred to as beam measurement, a beam measurement result, a beam report or a beam measurement report.

CSI measurement for a beam report may include interference measurement. The UE may measure channel quality or an interference by using a resource for CSI measurement, and derive the beam report. The resource for CSI measurement may be at least one of, for example, an SS/PBCH block resource, a CSI-RS resource and other reference signal resources. Configuration information of the CSI measurement report may be configured to the UE by using a higher layer signaling.

The beam report may include a result of at least one of channel quality measurement and interference measurement. The channel quality measurement result may include, for example, L1-RSRP. The interference measurement result may include the L1-SINR, the L1-SNR, the L1-RSRQ and other indices related to the interference (e.g., arbitrary indices other than L1-RSRP).

In addition, a CSI measurement resource for beam management may be referred to as a beam measurement resource. Furthermore, a CSI measurement target signal/channel may be referred to as a beam measurement signal. Furthermore, CSI measurement/reporting may be read as at least one of measurement/reporting for beam management, beam measurement/reporting and radio link quality measurement/reporting.

CSI reporting configuration information that takes beam management of current NR into account will be described with reference to FIG. 1. FIG. 1 illustrates an excerpt of the RRC information element "CSI-ReportConfig". FIG. 1 is drawn by using an Abstract Syntax Notation One (ASN.1) notation (the same applies to mentioned-below FIGS. 2A, 2B, 3A, 3B, 5 and 6, too).

The CSI reporting configuration information (CSI-ReportConfig) may include a "report quantity" (that may be expressed as an RRC parameter "reportQuantity") that is information of a parameter to be reported. The report quality is defined as a type of an ASN. 1 object that is "choice". Hence, one of parameters (such as cri-RSRP and ssb-Index-RSRP) defined as the report quantity is configured.

The UE for which a higher layer parameter (e.g. RRC parameter "groupBasedBeamReporting") included in the CSI reporting configuration information has been configured to enabled may include a plurality of beam measurement resource IDs (e.g., SSB RIs or CRIs) and a plurality of measurement results (e.g., L1-RSRP) associated with these beam measurement resource IDs in a beam report for each report configuration.

The UE to which the number of report target RS resources that is one or more has been configured by a higher layer parameter (e.g., RRC parameter "nrofReportedRS") included in the CSI reporting configuration information may include one or more beam measurement resource IDs and one or more measurement results (e.g., L1-RSRP) associated with these beam measurement resource IDs in a beam report for each report configuration.

By the way, according to Rel-15 NR, cri-RSRP and ssb-Index-RSRP among report quantities relate to beam management. The UE to which the cri-RSRP has been configured reports a CRI and L1-RSRP associated with the CRI. The UE to which the ssb-Index-RSRP has been configured reports an SSBRI and L1-RSRP associated with the CRI.

However, according to NR that has been studied so far, it is only possible to perform beam selection based on only the L1-RSRP. Furthermore, it is not possible to make a configuration for including an interference report (a report of, for example, L1-RSRQ) in a beam report. When beam selection and reporting relate to only the L1-RSRP, it is not possible to appropriately perform beam selection, and therefore there is a risk that a communication throughput lowers.

Hence, the inventors of the present invention have conceived a CSI reporting configuration for appropriately selecting a beam and reporting the beam.

Embodiments according to the present disclosure will be described in detail below with reference to the drawings. A radio communication method according to each embodiment may be each applied alone or may be applied in combination.

In the present disclosure, an "interference" may be read as an SINR, an SNR, RSRQ, other indices related to the interference (e.g., arbitrary indices other than L1-RSRP) and interference power. Furthermore, "L1-RSRQ/SINR" may be read as at least one of L1-RSRQ and an L1-SINR.

(Radio Communication Method)

First Embodiment

According to the first embodiment, a UE may perform beam selection based on only L1-RSRP, may perform beam selection based on only L1-RSRQ/SINR, or may perform beam selection based on both of the L1-RSRP and L1-RSRQ/SINR.

Information related to beam selection criteria (indices) may be configured to the UE by using a higher layer signaling. The information may be referred to as index information below.

The index information may be defined by a new RRC parameter (or an RRC information element). The index information may be defined by, for example, an RRC parameter "beamselectioncriteria (or beamSelectionCriteria)". The index information may be included in CSI reporting configuration information (CSI-ReportConfig), and notified to the UE, or may be notified separately from the CSI reporting configuration information.

FIGS. 2A and 2B are diagrams illustrating one example of the RRC parameter that indicates the index information. The UE may use, for example, one of followings as the beam selection index based on a value of the index information in FIGS. 2A and 2B:
L1-RSRP,
L1-RSRQ,
An L1-SINR,
L1-RSRP and L1-RSRQ, and
L1-RSRP and an L1-SINR.

FIG. 2A illustrates one example of a definition in a case where CHOICE according to ASN.1 notation is used. In a case of CHOICE, only one of listed values can be selected, and therefore it is necessary to include such a field when a plurality of indices are indicated. When, for example, L1-RSRP and L1-RSRQ are indicated, "L1-RSRP-RSRQ" is selected.

FIG. 2B illustrates one example of a definition in a case where SEQUENCE according to the ASN.1 notation is used. In a case of SEQUENCE, one or a plurality of listed values can be selected ("OPTIONAL" means not indispensable), and therefore a plurality of dedicated fields only need to be included when a plurality of indices are indicated. When, for example, the L1-RSRP and the L1-RSRQ are indicated, "L1-RSRP" and "L1-RSRQ" are selected.

FIGS. 3A and 3B are diagrams illustrating another example of the RRC parameter that indicates the index information. The UE may use, for example, one of followings as a beam selection index based on values of the index information in FIGS. 3A and 3B:
csi-RSRP,
ssb-RSRP,
csi-RSRQ,
ssb-RSRQ,
A csi-SINR,
An ssb-SINR,
csi-RSRP and csi-RSRQ,
ssb-RSRP and ssb-RSRQ,
csi-RSRP and a csi-SINR, and
ssb-RSRP and an ssb-SINR.

FIGS. 3A and 3B respectively illustrate corresponding indices that express the indices in FIGS. 2A and 2B as items of specific measurement contents. This is because, as L1-RSRP/RSRQ/SINR, csi-RSRP/RSRQ/SINR that are measurement values based on a CSI-RS, or ssb-RSRP/RSRQ/SINR that are measurement values based on an SSB (e.g., an SSS in an SSB and/or a DMRS) are actually used.

In addition, even when the CSI reporting configuration information includes the index information, the report quantity including the CSI reporting configuration information may instruct a measurement result different from the index indicated by the index information.

Furthermore, when the CSI reporting configuration information does not include the index information or the index information is not specified, the UE may determine the beam selection criteria (indices) based on a report quantity ("reportQuantity") included in the CSI reporting configuration information.

When, for example, the report quantity configured to the UE instructs reporting of the csi-SINR, the UE may perform beam selection based on the L1-SINR (csi-SINR), and report the csi-SINR of a selected beam. Candidate values of the report quantity will be described in the second embodiment.

When a combination of the L1-RSRP and the L1-RSRQ/SINR is configured as the beam selection index to the UE, and when a group-based beam report is configured to disabled by a higher layer signaling, the UE may include different nrofReportedRS CRIs/SSBRIs in one report for each report configuration to report.

The UE may first determine M best candidate RSs (candidate beams) based on the L1-RSRP. In this regard, a value of M may be configured by a higher layer signaling, or may be defined by a specification. In addition, M may be assumed as a value equal to or more than nrofReportedRS. Subsequently, the UE may determine nrofReportedRS measurement results to report from a result of the determined M candidate RSs based on the L1-RSRQ/SINR.

The UE may determine the above M best candidate RSs according to one of followings:
(1) The M best candidate RSs in order of larger values,
(2) The M best candidate RSs within a given range (gap) (e.g., X dB) from L1-RSRP of the largest value, and
(3) The M best candidate RSs larger than a given threshold (e.g., Y dBm).

The UE may determine the above nrofReportedRS measurement results according to one of followings:
(A) The nrofReportedRS measurement results in order of larger values,
(B) The nrofReportedRS measurement results within a given range (gap) from L1-RSRP of the largest value, and
(C) The nrofReportedRS measurement results larger than a given threshold.

These given range and given threshold may be configured to the UE by using a higher layer signaling, a physical layer signaling or a combination of these signalings.

Conversely, the UE may first determine the M best candidate RSs based on the L1-RSRQ/SINR, and subsequently determine the nrofReportedRS measurement results to report based on L1-RSRP.

A case where the UE determines candidate RSs by using one of above (1) to (3), and then determines a report target by using above (A) will be described with reference to FIG. 4. FIG. 4 is a diagram illustrating one example of beam selection. This example assumes that the UE is configured to measure eight transmission beams (Tx beams #1 to #8) transmitted from a base station (TXRU 1). Furthermore, the UE measures these transmission beams by using two reception beams (Rx beams #1 and #2).

In addition, M=4 and nrofReportedRS=2 are configured. Furthermore, above given range=3 dB and above given threshold=−60 dBm are assumed.

In a case based on above (1), the UE may first select four transmission beams in order of larger values from L1-RSRP that is a combination of all transmission beams and reception beams. A measurement result of {transmission beam, reception beam}={4, 1} corresponds to the best L1-RSRP at −56 dBm. Thus, the UE first selects four sets of {transmission beam, reception beam}={4, 1}, {1, 1}, {2, 1} and {5, 2}.

FIG. 4 illustrates L1-RSRQ of the four sets. A maximum value of these sets is 30 dB of {transmission beam, reception beam}={1, 1}. Thus, the UE determines two sets of {transmission beam, reception beam}={1, 1} and {5, 2} as report targets.

In a case based on above (2), L1-RSRP of {transmission beam, reception beam}={5, 2} is −60 dBm, and is not included within the above given range from best −56 dBm. In this case, the UE first selects three sets of {transmission beam, reception beam}={4, 1}, {1, 1} and {2, 1}. Subsequently, the UE determines the two sets of {transmission beam, reception beam}={1, 1} and {2, 1} as report targets.

In a case based on above (3), the UE first selects four sets of {transmission beam, reception beam}={4, 1}, {1, 1}, {2, 1} and {5, 2}. Subsequently, the UE determines two sets of {transmission beam, reception beam}={1, 1} and {5, 2} as report targets.

According to the above-described first embodiment, the UE can appropriately determine the beam selection criteria, and perform beam selection.

Second Embodiment

The second embodiment relates to a report quantity for reporting at least one of RSRQ and an SINR.

The report quantity may be a parameter expanded from a legacy RRC parameter "reportQuantity" or may be expressed as a new RRC parameter. The new RRC parameter may be included in CSI reporting configuration information (CSI-ReportConfig) and notified to a UE.

FIG. 5 is a diagram illustrating one example of a report quantity for reporting at least one of RSRQ and an SINR. The report quantity is a parameter expanded from the legacy RRC parameter "reportQuantity".

For example, one of followings can be indicated as a report target by using the report quantity:
  csi-RSRQ (when "cri-RSRQ" is configured),
  ssb-RSRQ (when "ssb-Index-RSRQ" is configured),
  A csi-SINR (when "cri-SINR" is configured),
  An ssb-SINR (when "ssb-Index-SINR" is configured),
  csi-RSRP and csi-RSRQ (when "cri-RSRP-RSRQ" is configured),
  ssb-RSRP and ssb-RSRQ (when "ssb-Index-RSRP-RSRQ" is configured),
  csi-RSRP and a csi-SINR (when "cri-RSRP-SINR" is configured), and
  ssb-RSRP and an ssb-SINR (when "ssb-Index-RSRP-SINR" is configured).

When, for example, "cri-RSRQ" is configured as the report quantity, the UE may report the csi-RSRQ and CRI associated with the csi-RSRQ. Furthermore, when "ssb-Index-RSRP-SINR" is configured as the report quantity, the UE may report the ssb-RSRP, the ssb-SINR and an SSBRI associated with the ssb-RSRP and the ssb-SINR.

In addition, the UE may include the CRI associated with a measurement result in a report including the measurement report that starts from "csi-". In addition, the UE may include the SSBRI associated with a measurement result in a report including the measurement report that starts from "ssb-".

Furthermore, in the present disclosure, names that start from "cri-" such "cri-RSRQ" and "cri-RSRP-SINR" may be read as names that start from "csi-" such as "csi-RSRQ" and "csi-RSRP-SINR".

FIG. 6 is a diagram illustrating another example of the report quantity for reporting at least one of the RSRQ and the SINR. The report quantity is configured by a new RRC parameter "reportQuantity-r16". The report target that can be indicated may be similar to the report target described with reference to FIG. 5.

This parameter may be notified to the UE that complies with, for example, Rel-16 NR. When "reportQuantity-r16" is configured to the UE, the UE may ignore "reportQuantity". The legacy RRC parameter "reportQuantity" may be configured to an Rel-15 UE. The Rel-15 UE may ignore a configuration of "reportQuantity-r16". By so doing, it is possible to reserve backward compatibility of a specification.

When a report quantity for which at least one of the csi-RSRQ, the ssb-RSRQ, the csi-SINR and the ssb-SINR is configured as the report target is configured to the UE, the UE may assume at least one of followings:
  To perform low latency beam selection (or measurement or report),
  To perform low overhead beam selection (or measurement or report),
  To perform beam failure recovery in a secondary cell,
  To use an interference measurement result (e.g., RSRQ or an SINR) for beam failure recovery,
  To use an interference measurement result (e.g., RSRQ or an SINR) for beam selection, and
  To include an interference measurement result (e.g., RSRQ or an SINR) in a beam report.

In addition, low latency beam selection may be referred to as fast beam selection, beam selection w/o TCI state, a beam selection type II or a TCI state indication type 2.

Furthermore, low overhead beam selection may be, for example, a method for skipping reporting a beam report under a given condition.

In addition, the UE may transmit, to a base station, UE capability information related to whether or not at least one of the RSRQ and the SINR can be reported. The base station may configure the report quantity described in the second embodiment to the UE that has the UE capability information.

Furthermore, the UE to which the number of report target RS resources that is two or more has been configured by a higher layer parameter (e.g., RRC parameter "nrofReportedRS") included in the CSI reporting configuration information may report L1-RSRP or L1-RSRQ/SINR associated with a certain RS in a form of a difference from maximum L1-RSRP or L1-RSRQ/SINR.

According to the above-described second embodiment, the UE can appropriately determine beam report targets.

Others

The base station may perform control for using a beam (e.g., transmission beam) associated with a report reported from the UE, or may perform control for determining a beam used based on a beam associated with a reported report.

Even when performing beam selection based on only L1-RSRP, the UE may report L1-RSRQ/SINR, too, in addition to L1-RSRP of the selected beam. By so doing, it is possible to provide a decision basis for beam determination of the base station.

(Radio Communication System)

The configuration of the radio communication system according to one embodiment of the present disclosure will be described below. This radio communication system uses one or a combination of the radio communication method according to each of the above embodiments of the present disclosure to perform communication.

FIG. 7 is a diagram illustrating one example of a schematic configuration of the radio communication system according to the one embodiment. A radio communication system 1 can apply at least one of Carrier Aggregation (CA) and Dual Connectivity (DC) that aggregates a plurality of base frequency blocks (component carriers) whose 1 unit is a system bandwidth (e.g., 20 MHz).

In this regard, the radio communication system 1 may be referred to as Long Term Evolution (LTE), LTE-Advanced (LTE-A), LTE-Beyond (LTE-B), SUPER 3G, IMT-Advanced, the 4th generation mobile communication system (4G), the 5th generation mobile communication system (5G), New Radio (NR), Future Radio Access (FRA) and the New Radio Access Technology (New-RAT), or a system that realizes these techniques.

The radio communication system 1 includes a base station 11 that forms a macro cell C1 of a relatively wide coverage, and base stations 12 (12a to 12c) that are located in the macro cell C1 and form small cells C2 narrower than the macro cell C1. Furthermore, a user terminal 20 is located in the macro cell C1 and each small cell C2. An arrangement and the numbers of respective cells and the user terminals 20 are not limited to the aspect illustrated in FIG. 7.

The user terminal 20 can connect with both of the base station 11 and the base stations 12. The user terminal 20 is assumed to concurrently use the macro cell C1 and the small cells C2 by using CA or DC. Furthermore, the user terminal 20 can apply CA or DC by using a plurality of cells (CCs).

The user terminal 20 and the base station 11 can communicate by using a carrier (also referred to as a legacy carrier) of a narrow bandwidth in a relatively low frequency band (e.g., 2 GHz). On the other hand, the user terminal 20 and each base station 12 may use a carrier of a wide bandwidth in a relatively high frequency band (e.g., 3.5 GHz or 5 GHz) or may use the same carrier as that used between the user terminal 20 and the base station 11. In this regard, a configuration of the frequency band used by each base station is not limited to this.

Furthermore, the user terminal 20 can perform communication by using at least one of Time Division Duplex (TDD) and Frequency Division Duplex (FDD) in each cell. Furthermore, each cell (carrier) may be applied a single numerology or may be applied a plurality of different numerologies.

The numerology may be a communication parameter to be applied to at least one of transmission and reception of a certain signal or channel, and may indicate at least one of, for example, a subcarrier spacing, a bandwidth, a symbol length, a cyclic prefix length, a subframe length, a TTI length, the number of symbols per TTI, a radio frame configuration, specific filtering processing performed by a transceiver in a frequency domain, and specific windowing processing performed by the transceiver in a time domain.

For example, a case where at least one of subcarrier spacings of constituent OFDM symbols and the number of OFDM symbols are different on a certain physical channel may be read as that numerologies are different.

The base station 11 and each base station 12 (or the two base stations 12) may be connected by way of wired connection (e.g., optical fibers compliant with a Common Public Radio Interface (CPRI) or an X2 interface) or radio connection.

The base station 11 and each base station 12 are each connected with a higher station apparatus 30 and connected with a core network 40 via the higher station apparatus 30. In this regard, the higher station apparatus 30 includes, for example, an access gateway apparatus, a Radio Network Controller (RNC) and a Mobility Management Entity (MME), yet is not limited to these. Furthermore, each base station 12 may be connected with the higher station apparatus 30 via the base station 11.

In this regard, the base station 11 is a base station that has a relatively wide coverage, and may be referred to as a macro base station, an aggregate node, an eNodeB (eNB) or a transmission/reception point. Furthermore, each base station 12 is a base station that has a local coverage, and may be referred to as a small base station, a micro base station, a pico base station, a femto base station, a Home eNodeB (HeNB), a Remote Radio Head (RRH) or a transmission/reception point. The base stations 11 and 12 will be collectively referred to as a base station 10 below when not distinguished.

Each user terminal 20 is a terminal that supports various communication schemes such as LTE, LTE-A and 5G, and may include not only a mobile communication terminal (mobile station) but also a fixed communication terminal (fixed station).

The radio communication system 1 applies Orthogonal Frequency-Division Multiple Access (OFDMA) to downlink and applies at least one of Single Carrier-Frequency Division Multiple Access (SC-FDMA) and OFDMA to uplink as radio access schemes.

OFDMA is a multicarrier transmission scheme that divides a frequency band into a plurality of narrow frequency bands (subcarriers) and maps data on each subcarrier to perform communication. SC-FDMA is a single carrier transmission scheme that divides a system bandwidth into bands including one or contiguous resource blocks per terminal and causes a plurality of terminals to use respectively different bands to reduce an inter-terminal interference. In this regard, uplink and downlink radio access schemes are not limited to a combination of these schemes, and other radio access schemes may be used.

The radio communication system 1 uses a downlink shared channel (PDSCH: Physical Downlink Shared Channel) shared by each user terminal 20, a broadcast channel (PBCH: Physical Broadcast Channel) and a downlink control channel as downlink channels. User data, higher layer control information and a System Information Block (SIB) are conveyed on the PDSCH. Furthermore, a Master Information Block (MIB) is conveyed on the PBCH.

The downlink control channel includes a Physical Downlink Control Channel (PDCCH), an Enhanced Physical Downlink Control Channel (EPDCCH), a Physical Control Format Indicator Channel (PCFICH), and a Physical Hybrid-ARQ Indicator Channel (PHICH). Downlink Control Information (DCI) including scheduling information of at least one of the PDSCH and the PUSCH is conveyed on the PDCCH.

In addition, DCI for scheduling DL data reception may be referred to as a DL assignment, and DCI for scheduling UL data transmission may be referred to as a UL grant.

The number of OFDM symbols used for the PDCCH is conveyed on the PCFICH. Transmission acknowledgement information (also referred to as, for example, retransmission control information, HARQ-ACK or ACK/NACK) of a Hybrid Automatic Repeat reQuest (HARQ) for the PUSCH may be conveyed on the PHICH. The EPDCCH is subjected to frequency division multiplexing with the PDSCH (downlink shared data channel) and is used to convey DCI similar to the PDCCH.

The radio communication system 1 uses an uplink shared channel (PUSCH: Physical Uplink Shared Channel) shared by each user terminal 20, an uplink control channel (PUCCH: Physical Uplink Control Channel), and a random access channel (PRACH: Physical Random Access Channel) as uplink channels. User data and higher layer control information are conveyed on the PUSCH. Furthermore, downlink radio quality information (CQI: Channel Quality Indicator), transmission acknowledgement information and a Scheduling Request (SR) are conveyed on the PUCCH. A random access preamble for establishing connection with a cell is conveyed on the PRACH.

The radio communication system 1 conveys a Cell-specific Reference Signal (CRS), a Channel State Information-Reference Signal (CSI-RS), a DeModulation Reference Signal (DMRS) and a Positioning Reference Signal (PRS) as downlink reference signals. Furthermore, the radio communication system 1 conveys a Sounding Reference Signal (SRS) and a DeModulation Reference Signal (DMRS) as uplink reference signals. In this regard, the DMRS may be referred to as a user terminal-specific reference signal (UE-specific reference signal). Furthermore, a reference signal to be conveyed is not limited to these.

(Base Station)

Figure 8:
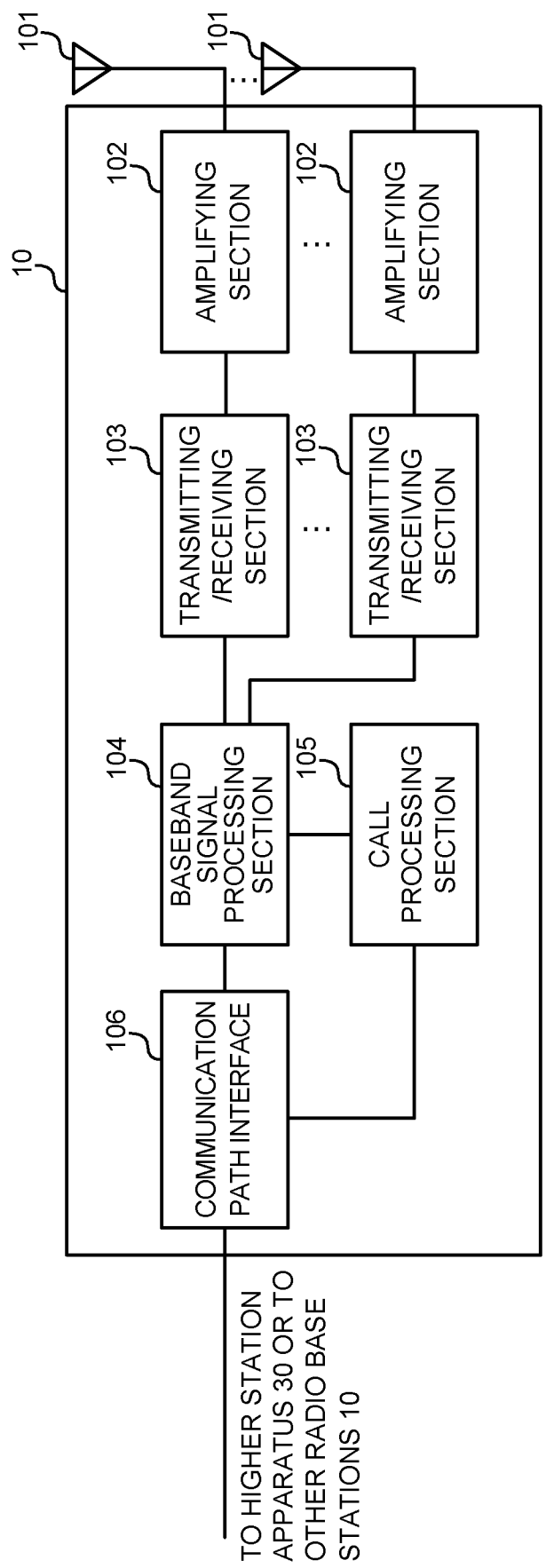
FIG. 8 is a diagram illustrating one example of an overall configuration of a base station according to the one embodiment.

FIG. 8 is a diagram illustrating one example of an overall configuration of the base station according to the one embodiment. The base station 10 includes pluralities of transmission/reception antennas 101, amplifying sections 102 and transmitting/receiving sections 103, a baseband signal processing section 104, a call processing section 105 and a communication path interface 106. In this regard, the base station 10 only needs to be configured to include one or more of each of the transmission/reception antennas 101, the amplifying sections 102 and the transmitting/receiving sections 103.

User data transmitted from the base station 10 to the user terminal 20 on downlink is input from the higher station apparatus 30 to the baseband signal processing section 104 via the communication path interface 106.

The baseband signal processing section 104 performs processing of a Packet Data Convergence Protocol (PDCP) layer, segmentation and concatenation of the user data, transmission processing of a Radio Link Control (RLC) layer such as RLC retransmission control, Medium Access Control (MAC) retransmission control (e.g., HARQ transmission processing), and transmission processing such as scheduling, transmission format selection, channel coding, Inverse Fast Fourier Transform (IFFT) processing, and precoding processing on the user data, and transfers the user data to each transmitting/receiving section 103. Furthermore, the baseband signal processing section 104 performs transmission processing such as channel coding and inverse fast Fourier transform on a downlink control signal, too, and transfers the downlink control signal to each transmitting/receiving section 103.

Each transmitting/receiving section 103 converts a baseband signal precoded and output per antenna from the baseband signal processing section 104 into a radio frequency range, and transmits a radio frequency signal. The radio frequency signal subjected to frequency conversion by each transmitting/receiving section 103 is amplified by each amplifying section 102, and is transmitted from each transmission/reception antenna 101. The transmitting/receiving sections 103 can be composed of transmitters/receivers, transmission/reception circuits or transmission/reception apparatuses described based on a common knowledge in a technical field according to the present disclosure. In this regard, the transmitting/receiving sections 103 may be composed as an integrated transmitting/receiving section or may be composed of transmission sections and reception sections.

Meanwhile, each amplifying section 102 amplifies a radio frequency signal received by each transmission/reception antenna 101 as an uplink signal. Each transmitting/receiving section 103 receives the uplink signal amplified by each amplifying section 102. Each transmitting/receiving section 103 performs frequency conversion on the received signal into a baseband signal, and outputs the baseband signal to the baseband signal processing section 104.

The baseband signal processing section 104 performs Fast Fourier Transform (FFT) processing, Inverse Discrete Fourier Transform (IDFT) processing, error correcting decoding, MAC retransmission control reception processing, and reception processing of an RLC layer and a PDCP layer on user data included in the input uplink signal, and transfers the user data to the higher station apparatus 30 via the communication path interface 106. The call processing section 105 performs call processing (such as configuration and release) of a communication channel, state management of the base station 10 and radio resource management.

The communication path interface 106 transmits and receives signals to and from the higher station apparatus 30 via a given interface. Furthermore, the communication path interface 106 may transmit and receive (backhaul signaling) signals to and from the another base station 10 via an inter-base station interface (e.g., optical fibers compliant with the Common Public Radio Interface (CPRI) or the X2 interface).

Figure 9:
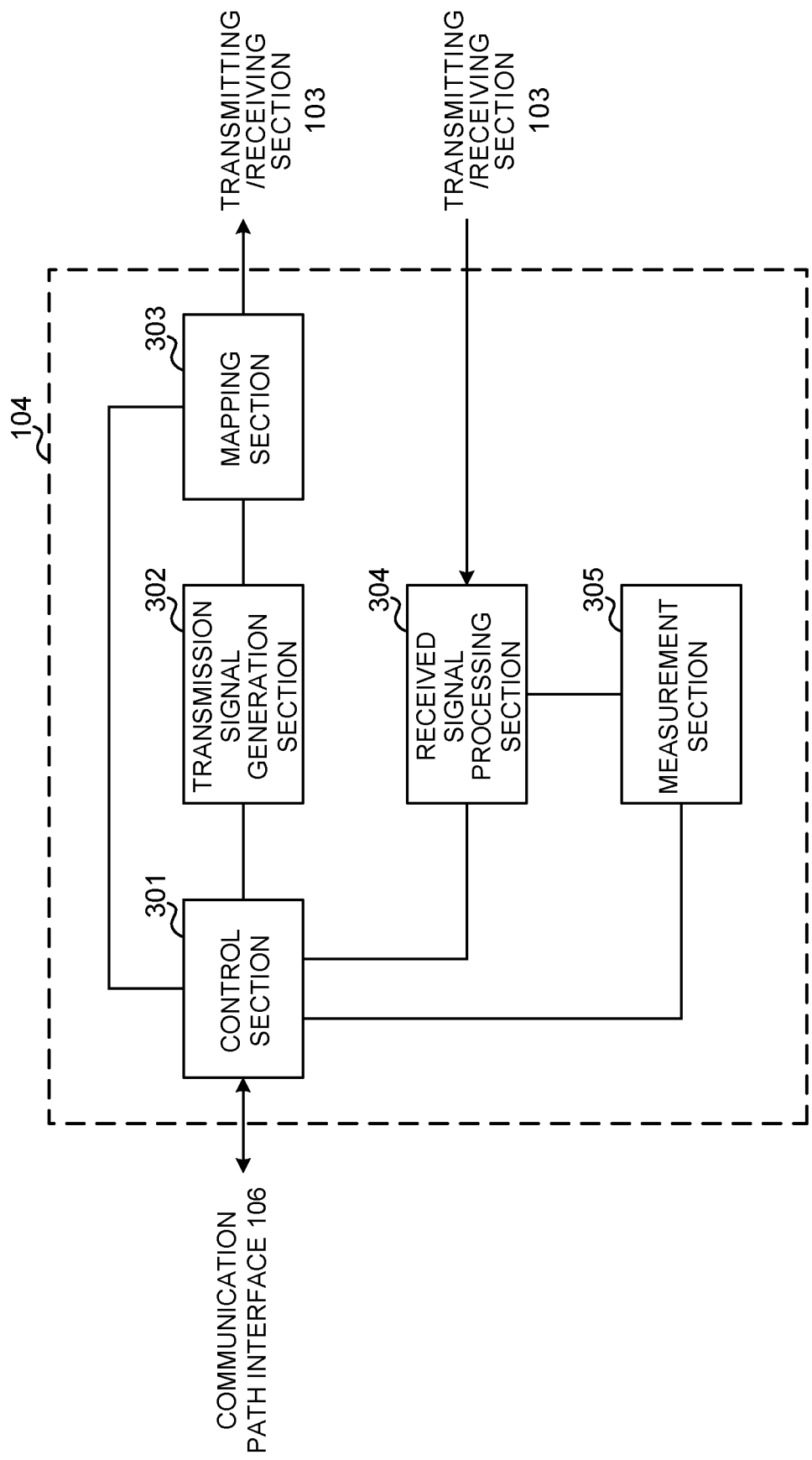
FIG. 9 is a diagram illustrating one example of a function configuration of the base station according to the one embodiment.

FIG. 9 is a diagram illustrating one example of a function configuration of the base station according to the one embodiment. In addition, this example mainly illustrates function blocks of characteristic portions according to the present embodiment, and assumes that the base station 10 includes other function blocks, too, that are necessary for radio communication.

The baseband signal processing section 104 includes at least a control section (scheduler) 301, a transmission signal generating section 302, a mapping section 303, a received signal processing section 304 and a measurement section 305. In addition, these components only need to be included in the base station 10, and part or all of the components may not be included in the baseband signal processing section 104.

The control section (scheduler) 301 controls the entire base station 10. The control section 301 can be composed of a controller, a control circuit or a control apparatus described based on the common knowledge in the technical field according to the present disclosure.

The control section 301 controls, for example, signal generation of the transmission signal generating section 302 and signal allocation of the mapping section 303. Furthermore, the control section 301 controls signal reception processing of the received signal processing section 304 and signal measurement of the measurement section 305.

The control section 301 controls scheduling (e.g., resource allocation) of system information, a downlink data signal (e.g., a signal that is transmitted by using a downlink shared channel), and a downlink control signal (e.g., a signal that is transmitted by using a downlink control channel). Furthermore, the control section 301 controls generation of a downlink control signal and a downlink data signal based on a result obtained by deciding whether or not it is necessary to perform retransmission control on an uplink data signal.

The control section 301 controls scheduling of synchronization signals (e.g., a Primary Synchronization Signal (PSS)/a Secondary Synchronization Signal (SSS)) and downlink reference signals (e.g., a CRS, a CSI-RS and a DMRS).

The control section 301 controls scheduling of an uplink data signal (e.g., a signal that is transmitted by using an uplink shared channel), an uplink control signal (e.g., a signal that is transmitted by using an uplink control channel), a random access preamble and an uplink reference signal.

The transmission signal generating section 302 generates a downlink signal (such as a downlink control signal, a downlink data signal or a downlink reference signal) based on an instruction from the control section 301, and outputs the downlink signal to the mapping section 303. The transmission signal generating section 302 can be composed of a signal generator, a signal generating circuit or a signal generating apparatus described based on the common knowledge in the technical field according to the present disclosure.

The transmission signal generating section 302 generates, for example, at least one of a DL assignment for giving notification of downlink data allocation information, and a UL grant for giving notification of uplink data allocation information based on the instruction from the control section 301. The DL assignment and the UL grant are both DCI, and conform to a DCI format. Furthermore, the transmission signal generating section 302 performs encoding processing and modulation processing on the downlink data signal according to a code rate and a modulation scheme determined based on Channel State Information (CSI) from each user terminal 20.

The mapping section 303 maps the downlink signal generated by the transmission signal generating section 302, on given radio resources based on the instruction from the control section 301, and outputs the downlink signal to each transmitting/receiving section 103. The mapping section 303 can be composed of a mapper, a mapping circuit or a mapping apparatus described based on the common knowledge in the technical field according to the present disclosure.

The received signal processing section 304 performs reception processing (e.g., demapping, demodulation and decoding) on a received signal input from each transmitting/receiving section 103. In this regard, the received signal is, for example, an uplink signal (such as an uplink control signal, an uplink data signal or an uplink reference signal) transmitted from the user terminal 20. The received signal processing section 304 can be composed of a signal processor, a signal processing circuit or a signal processing apparatus described based on the common knowledge in the technical field according to the present disclosure.

The received signal processing section 304 outputs information decoded by the reception processing to the control section 301. When, for example, receiving the PUCCH including HARQ-ACK, the received signal processing section 304 outputs the HARQ-ACK to the control section 301. Furthermore, the received signal processing section 304 outputs at least one of the received signal and the signal after the reception processing to the measurement section 305.

The measurement section 305 performs measurement related to the received signal. The measurement section 305 can be composed of a measurement instrument, a measurement circuit or a measurement apparatus described based on the common knowledge in the technical field according to the present disclosure.

For example, the measurement section 305 may perform Radio Resource Management (RRM) measurement or Channel State Information (CSI) measurement based on the received signal. The measurement section 305 may measure received power (e.g., Reference Signal Received Power (RSRP)), received quality (e.g., Reference Signal Received Quality (RSRQ), a Signal to Interference plus Noise Ratio (SINR) or a Signal to Noise Ratio (SNR)), a signal strength (e.g., a Received Signal Strength Indicator (RSSI)) or channel information (e.g., CSI). The measurement section 305 may output a measurement result to the control section 301.

In addition, each transmitting/receiving section 103 may transmit configuration information (e.g., at least one of a CSI-MeasConfig Information Element (IE), a CSI-ResourceConfig IE and a CSI-ReportConfig IE of RRC) related to measurement (or a measurement report or a report) for Channel State Information (CSI) to the user terminal 20. Each transmitting/receiving section 103 may receive the CSI transmitted from the user terminal 20.

In addition, each transmitting/receiving section 103 may transmit information (e.g., "beamselectioncriteria" or "reportQuantity" of RRC) related to a beam selection index to the user terminal 20. Each transmitting/receiving section 103 may receive the CSI transmitted from the user terminal 20.

The control section 301 may determine a beam used by the base station 10 or the user terminal 20 based on the CSI (beam report) from the user terminal 20.

(User Terminal)

Figure 10:
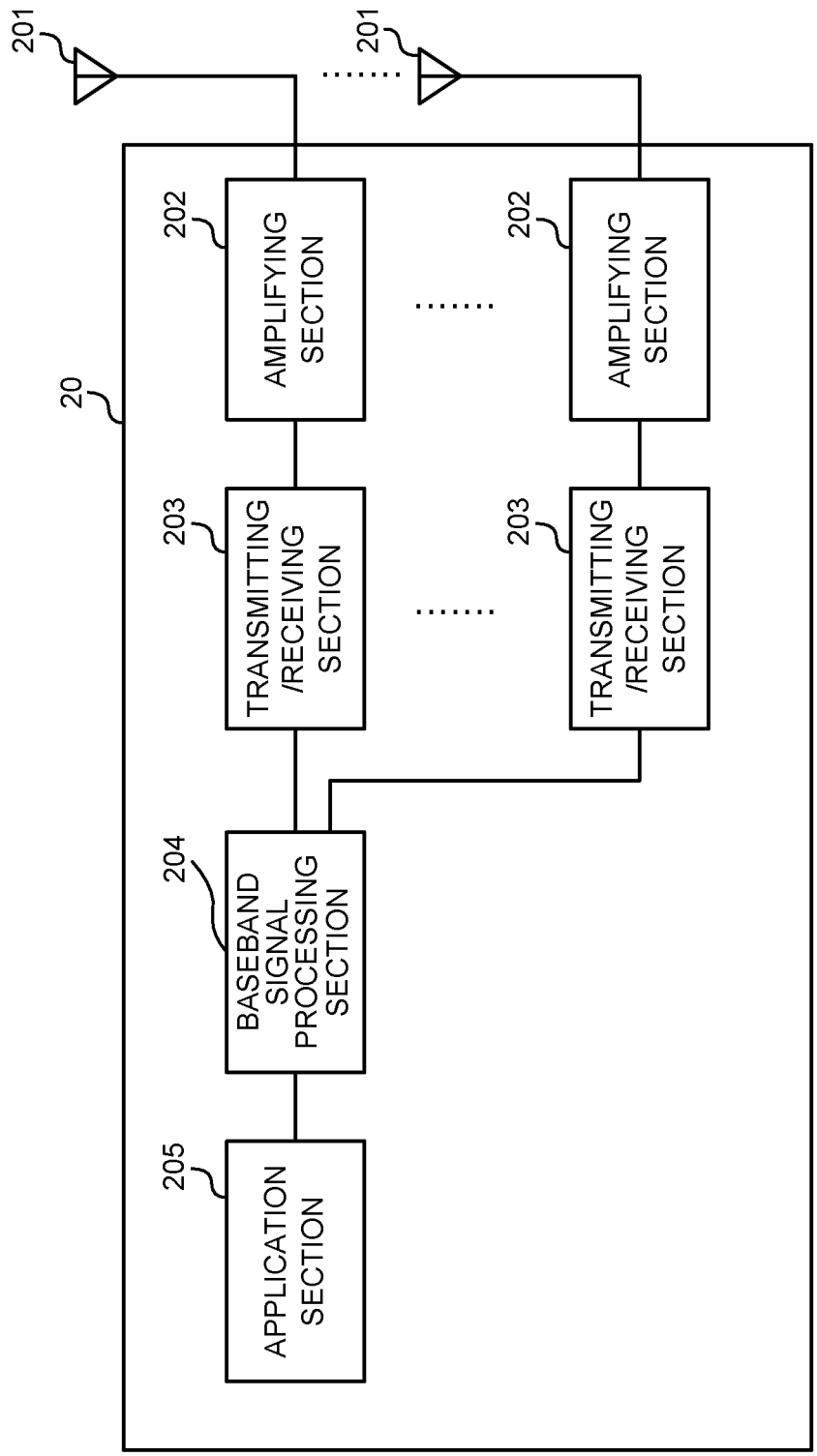
FIG. 10 is a diagram illustrating one example of an overall configuration of a user terminal according to the one embodiment.

FIG. 10 is a diagram illustrating one example of an overall configuration of the user terminal according to the one embodiment. The user terminal 20 includes pluralities of transmission/reception antennas 201, amplifying sections 202 and transmitting/receiving sections 203, a baseband signal processing section 204 and an application section 205. In this regard, the user terminal 20 only needs to be configured to include one or more of each of the transmission/reception antennas 201, the amplifying sections 202 and the transmitting/receiving sections 203.

Each amplifying section 202 amplifies a radio frequency signal received at each transmission/reception antenna 201. Each transmitting/receiving section 203 receives a downlink signal amplified by each amplifying section 202. Each transmitting/receiving section 203 performs frequency conversion on the received signal into a baseband signal, and outputs the baseband signal to the baseband signal processing section 204. The transmitting/receiving sections 203 can be composed of transmitters/receivers, transmission/reception circuits or transmission/reception apparatuses described based on the common knowledge in the technical field according to the present disclosure. In this regard, the transmitting/receiving sections 203 may be composed as an integrated transmitting/receiving section or may be composed of transmission sections and reception sections.

The baseband signal processing section 204 performs FFT processing, error correcting decoding and retransmission control reception processing on the input baseband signal. The baseband signal processing section 204 transfers downlink user data to the application section 205. The application section 205 performs processing related to layers higher than a physical layer and an MAC layer. Furthermore, the baseband signal processing section 204 may transfer broadcast information of the downlink data, too, to the application section 205.

On the other hand, the application section 205 inputs uplink user data to the baseband signal processing section 204. The baseband signal processing section 204 performs retransmission control transmission processing (e.g., HARQ transmission processing), channel coding, precoding, Discrete Fourier Transform (DFT) processing and IFFT processing on the uplink user data, and transfers the uplink user data to each transmitting/receiving section 203.

Each transmitting/receiving section 203 converts the baseband signal output from the baseband signal processing section 204 into a radio frequency range, and transmits a radio frequency signal. The radio frequency signal subjected to the frequency conversion by each transmitting/receiving section 203 is amplified by each amplifying section 202, and is transmitted from each transmission/reception antenna 201.

Figure 11:
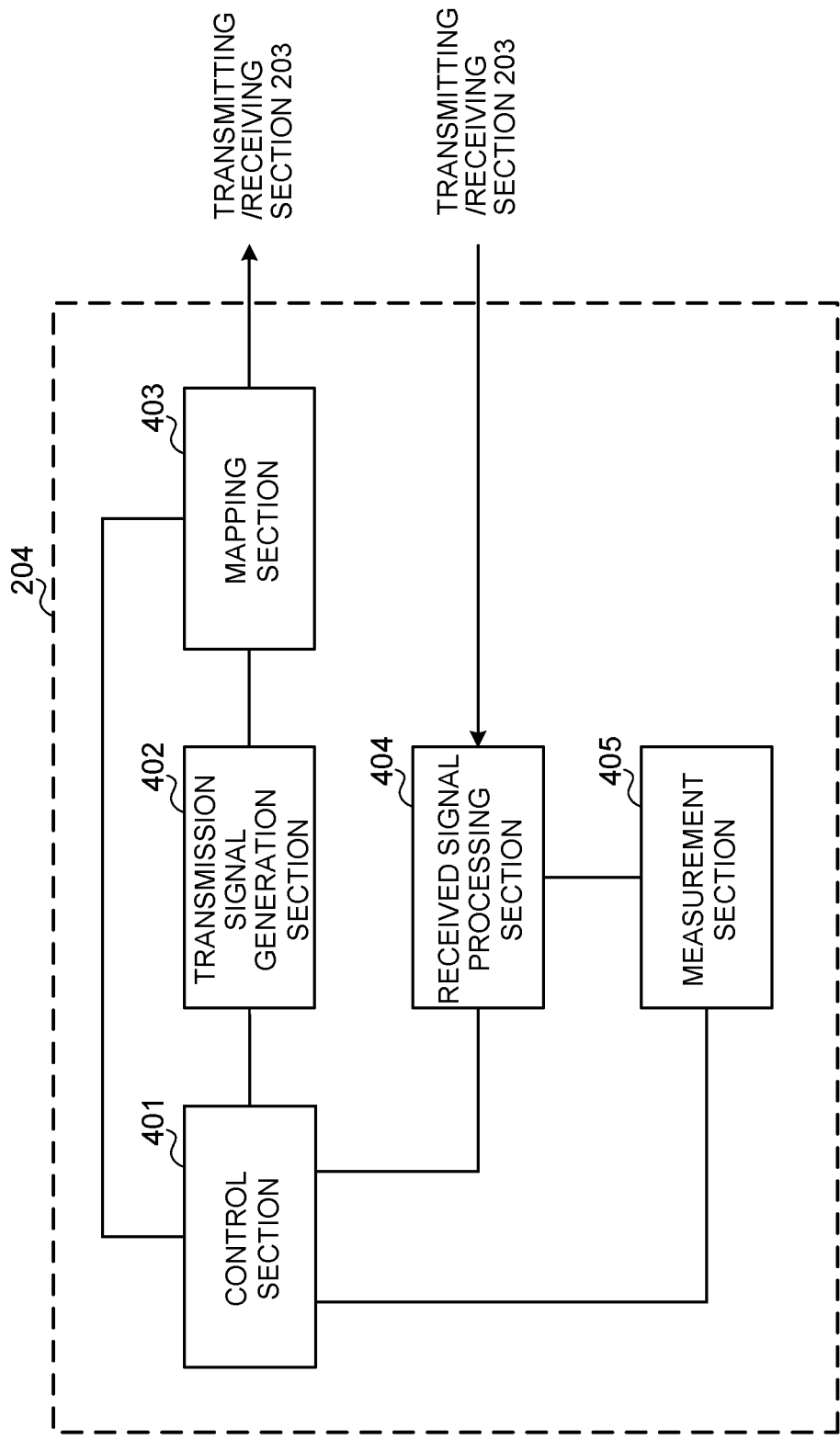
FIG. 11 is a diagram illustrating one example of a function configuration of the user terminal according to the one embodiment.

FIG. 11 is a diagram illustrating one example of a function configuration of the user terminal according to the one embodiment. In addition, this example mainly illustrates function blocks of characteristic portions according to the present embodiment, and assumes that the user terminal 20 includes other function blocks, too, that are necessary for radio communication.

The baseband signal processing section 204 of the user terminal 20 includes at least a control section 401, a transmission signal generating section 402, a mapping section 403, a received signal processing section 404 and a measurement section 405. In addition, these components only need to be included in the user terminal 20, and part or all of the components may not be included in the baseband signal processing section 204.

The control section 401 controls the entire user terminal 20. The control section 401 can be composed of a controller, a control circuit or a control apparatus described based on the common knowledge in the technical field according to the present disclosure.

The control section 401 controls, for example, signal generation of the transmission signal generating section 402 and signal allocation of the mapping section 403. Furthermore, the control section 401 controls signal reception processing of the received signal processing section 404 and signal measurement of the measurement section 405.

The control section 401 obtains from the received signal processing section 404 a downlink control signal and a downlink data signal transmitted from the base station 10. The control section 401 controls generation of an uplink control signal and an uplink data signal based on the downlink control signal as a result of deciding whether or not it is necessary to perform retransmission control on the downlink data signal.

When obtaining from the received signal processing section 404 various pieces of information notified from the base station 10, the control section 401 may update parameters used for control based on the various pieces of information.

The transmission signal generating section 402 generates an uplink signal (such as an uplink control signal, an uplink data signal or an uplink reference signal) based on an instruction from the control section 401, and outputs the uplink signal to the mapping section 403. The transmission signal generating section 402 can be composed of a signal generator, a signal generating circuit or a signal generating apparatus described based on the common knowledge in the technical field according to the present disclosure.

The transmission signal generating section 402 generates, for example, an uplink control signal related to transmission acknowledgement information and Channel State Information (CSI) based on the instruction from the control section 401. Furthermore, the transmission signal generating section 402 generates an uplink data signal based on the instruction from the control section 401. When, for example, the downlink control signal notified from the base station 10 includes a UL grant, the transmission signal generating section 402 is instructed by the control section 401 to generate an uplink data signal.

The mapping section 403 maps the uplink signal generated by the transmission signal generating section 402, on radio resources based on the instruction from the control section 401, and outputs the uplink signal to each transmitting/receiving section 203. The mapping section 403 can be composed of a mapper, a mapping circuit or a mapping apparatus described based on the common knowledge in the technical field according to the present disclosure.

The received signal processing section 404 performs reception processing (e.g., demapping, demodulation and decoding) on the received signal input from each transmitting/receiving section 203. In this regard, the received signal is, for example, a downlink signal (such as a downlink control signal, a downlink data signal or a downlink reference signal) transmitted from the base station 10. The received signal processing section 404 can be composed of a signal processor, a signal processing circuit or a signal processing apparatus described based on the common knowledge in the technical field according to the present disclosure. Furthermore, the received signal processing section 404 can compose the reception section according to the present disclosure.

The received signal processing section 404 outputs information decoded by the reception processing to the control section 401. The received signal processing section 404 outputs, for example, broadcast information, system information, an RRC signaling and DCI to the control section 401. Furthermore, the received signal processing section 404 outputs at least one of the received signal and the signal after the reception processing to the measurement section 405.

The measurement section 405 performs measurement related to the received signal. The measurement section 405 can be composed of a measurement instrument, a measurement circuit or a measurement apparatus described based on the common knowledge in the technical field according to the present disclosure. The measurement section 405 may compose at least part of a reception section according to the present disclosure.

For example, the measurement section 405 may perform RRM measurement or CSI measurement based on the received signal. The measurement section 405 may measure received power (e.g., RSRP), received quality (e.g., RSRQ, an SINR or an SNR), a signal strength (e.g., RSSI) or channel information (e.g., CSI). The measurement section 405 may output a measurement result to the control section 401.

In addition, each transmitting/receiving section 203 may receive the information (e.g., "beamselectioncriteria" or "reportQuantity" of RRC) related to the beam selection index. Each transmitting/receiving section 203 may transmit CSI including information (such as L1-RSRP, L1 interference power, L1-RSRQ or an L1-SINR) based on the above measurement and related to an interference to the base station 10.

The control section 401 may select a beam based on an index indicated by the information related to the above beam selection index.

The control section 401 may use configuration information (e.g., "reportQuantity" of RRC) of a report quantity of the channel state information as the information related to the beam selection index.

When a plurality of indices are indicated as the beam selection indices, the control section 401 may select first number (e.g., M) measurement results based on one (e.g., L1-RSRP) of the indices, and further select second number (e.g., "nrofReportedRS" of RRC) measurement results from the first number measurement results based on the other one (e.g., the L1-RSRQ or the L1-SINR) of the indices.

The control section 401 may control reporting of at least one of RSRQ (csi-RSRQ/ssb-RSRQ) and an SINR (csi-SINR/ssb-SINR) based on the configuration information (e.g., "reportQuantity" of RRC) of the report quantity of the channel state information.

(Hardware Configuration)

In addition, the block diagrams used to describe the above embodiments illustrate blocks in function units. These function blocks (components) are realized by an arbitrary combination of at least one of hardware and software. Furthermore, a method for realizing each function block is not limited in particular. That is, each function block may be realized by using one physically or logically coupled apparatus or may be realized by using a plurality of these apparatuses formed by connecting two or more physically or logically separate apparatuses directly or indirectly (by using, for example, wired connection or radio connection). Each function block may be realized by combining software with the above one apparatus or a plurality of above apparatuses.

In this regard, the functions include judging, determining, deciding, calculating, computing, processing, deriving, investigating, looking up, ascertaining, receiving, transmitting, outputting, accessing, resolving, selecting, choosing, establishing, comparing, assuming, expecting, considering, broadcasting, notifying, communicating, forwarding, configuring, reconfiguring, allocating, mapping, and assigning, yet are not limited to these. For example, a function block (component) that causes transmission to function may be referred to as a transmitting unit or a transmitter. As described above, the method for realizing each function block is not limited in particular.

Figure 12:
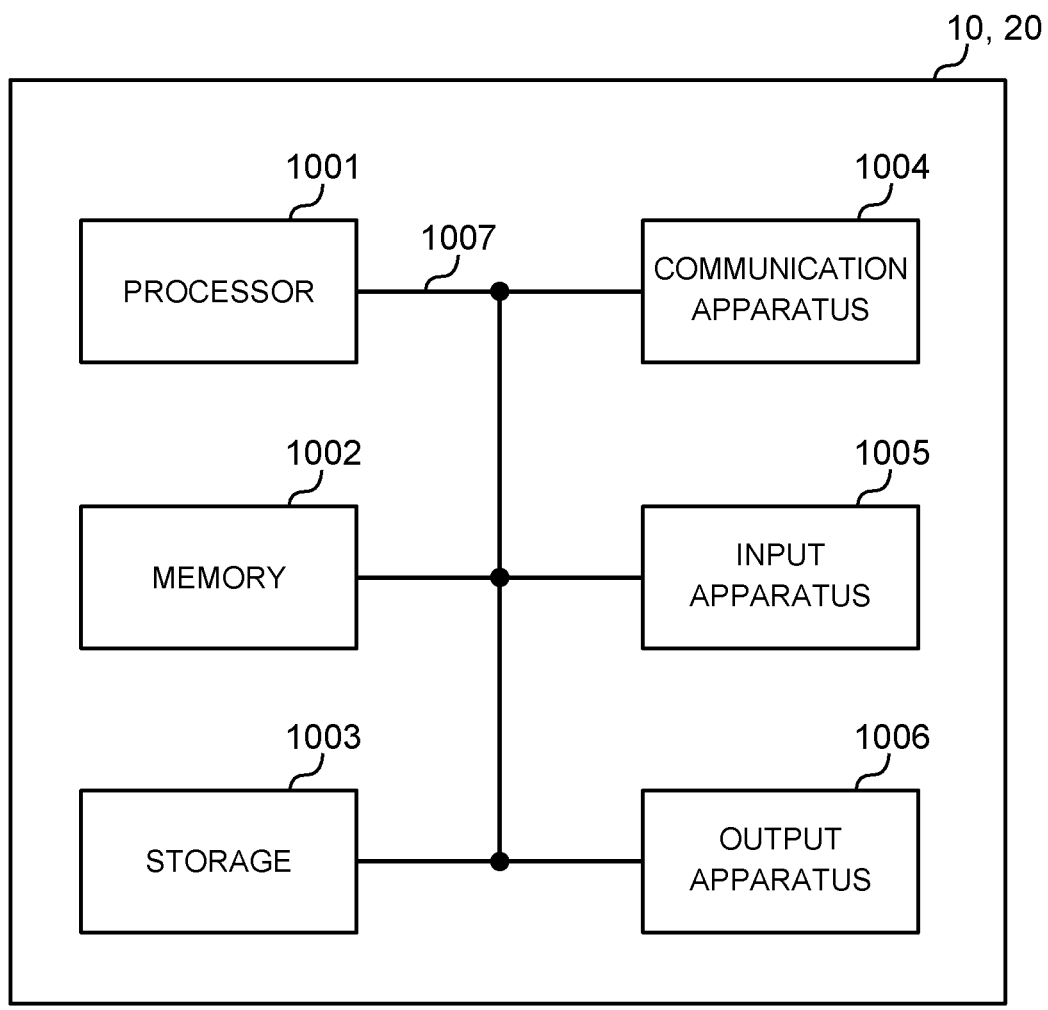
FIG. 12 is a diagram illustrating one example of hardware configurations of the base station and the user terminal according to the one embodiment.

For example, the base station and the user terminal according to the one embodiment of the present disclosure may function as computers that perform processing of the radio communication method according to the present disclosure. FIG. 12 is a diagram illustrating one example of the hardware configurations of the base station and the user terminal according to the one embodiment. The above-described base station 10 and user terminal 20 may be each physically configured as a computer apparatus that includes a processor 1001, a memory 1002, a storage 1003, a communication apparatus 1004, an input apparatus 1005, an output apparatus 1006 and a bus 1007.

In this regard, a word "apparatus" in the following description can be read as a circuit, a device or a unit. The hardware configurations of the base station 10 and the user terminal 20 may be configured to include one or a plurality of apparatuses illustrated in FIG. 12 or may be configured without including part of the apparatuses.

For example, FIG. 12 illustrates the only one processor 1001. However, there may be a plurality of processors. Furthermore, processing may be executed by 1 processor or processing may be executed by 2 or more processors concurrently or successively or by using another method. In addition, the processor 1001 may be implemented by 1 or more chips.

Each function of the base station 10 and the user terminal 20 is realized by, for example, causing hardware such as the processor 1001 and the memory 1002 to read given software (program), and thereby causing the processor 1001 to perform an operation, and control communication via the communication apparatus 1004 and control at least one of reading and writing of data in the memory 1002 and the storage 1003.

The processor 1001 causes, for example, an operating system to operate to control the entire computer. The processor 1001 may be composed of a Central Processing Unit (CPU) including an interface for a peripheral apparatus, a control apparatus, an operation apparatus and a register. For example, the above-described baseband signal processing section 104 (204) and call processing section 105 may be realized by the processor 1001.

Furthermore, the processor 1001 reads programs (program codes), a software module or data from at least one of the storage 1003 and the communication apparatus 1004 out to the memory 1002, and executes various types of processing according to these programs, software module or data. As the programs, programs that cause the computer to execute at least part of the operations described in the above-described embodiments are used. For example, the control section 401 of the user terminal 20 may be realized by a control program that is stored in the memory 1002 and operates on the processor 1001, and other function blocks may be also realized likewise.

The memory 1002 is a computer-readable recording medium, and may be composed of at least one of, for example, a Read Only Memory (ROM), an Erasable Programmable ROM (EPROM), an Electrically EPROM (EEPROM), a Random Access Memory (RAM) and other appropriate storage media. The memory 1002 may be referred to as a register, a cache or a main memory (main storage apparatus). The memory 1002 can store programs (program codes) and a software module that can be executed to perform the radio communication method according to the one embodiment of the present disclosure.

The storage 1003 is a computer-readable recording medium, and may be composed of at least one of, for example, a flexible disk, a floppy (registered trademark) disk, a magnetooptical disk (e.g., a compact disk (Compact Disc ROM (CD-ROM)), a digital versatile disk and a Blu-ray (registered trademark) disk), a removable disk, a hard disk drive, a smart card, a flash memory device (e.g., a card, a stick or a key drive), a magnetic stripe, a database, a server and other appropriate storage media. The storage 1003 may be referred to as an auxiliary storage apparatus.

The communication apparatus 1004 is hardware (transmission/reception device) that performs communication between computers via at least one of a wired network and a radio network, and is also referred to as, for example, a network device, a network controller, a network card and a communication module. The communication apparatus 1004 may be configured to include a high frequency switch, a duplexer, a filter and a frequency synthesizer to realize at least one of, for example, Frequency Division Duplex (FDD) and Time Division Duplex (TDD). For example, the above-described transmission/reception antennas 101 (201), amplifying sections 102 (202), transmitting/receiving sections 103 (203) and communication path interface 106 may be realized by the communication apparatus 1004. Each transmitting/receiving section 103 may be physically or logically separately implemented as a transmission section 103*a* and a reception section 103*b*.

The input apparatus 1005 is an input device (e.g., a keyboard, a mouse, a microphone, a switch, a button or a sensor) that accepts an input from an outside. The output apparatus 1006 is an output device (e.g., a display, a speaker or a Light Emitting Diode (LED) lamp) that sends an output to the outside. In addition, the input apparatus 1005 and the output apparatus 1006 may be an integrated component (e.g., touch panel).

Furthermore, each apparatus such as the processor 1001 or the memory 1002 is connected by the bus 1007 that communicates information. The bus 1007 may be composed by using a single bus or may be composed by using different buses between apparatuses.

Furthermore, the base station 10 and the user terminal 20 may be configured to include hardware such as a microprocessor, a Digital Signal Processor (DSP), an Application Specific Integrated Circuit (ASIC), a Programmable Logic Device (PLD) and a Field Programmable Gate Array (FPGA). The hardware may be used to realize part or entirety of each function block. For example, the processor 1001 may be implemented by using at least one of these types of hardware.

MODIFIED EXAMPLE

In addition, each term that has been described in the present disclosure and each term that is necessary to understand the present disclosure may be replaced with terms having identical or similar meanings. For example, at least one of a channel and a symbol may be a signal (signaling). Furthermore, a signal may be a message. A reference signal can be also abbreviated as an RS (Reference Signal), or may be referred to as a pilot or a pilot signal depending on standards to be applied. Furthermore, a Component Carrier (CC) may be referred to as a cell, a frequency carrier and a carrier frequency.

A radio frame may include one or a plurality of durations (frames) in a time domain Each of one or a plurality of durations (frames) that composes a radio frame may be referred to as a subframe. Furthermore, the subframe may include one or a plurality of slots in the time domain. The subframe may be a fixed time duration (e.g., 1 ms) that does not depend on the numerologies.

In this regard, the numerology may be a communication parameter to be applied to at least one of transmission and reception of a certain signal or channel. The numerology may indicate at least one of, for example, a SubCarrier Spacing (SCS), a bandwidth, a symbol length, a cyclic prefix length, a Transmission Time Interval (TTI), the number of symbols per TTI, a radio frame configuration, specific filtering processing performed by a transceiver in a frequency domain, and specific windowing processing performed by the transceiver in a time domain.

The slot may include one or a plurality of symbols (Orthogonal Frequency Division Multiplexing (OFDM) symbols or Single Carrier-Frequency Division Multiple Access (SC-FDMA) symbols) in the time domain. Furthermore, the slot may be a time unit based on the numerologies.

The slot may include a plurality of mini slots. Each mini slot may include one or a plurality of symbols in the time domain. Furthermore, the mini slot may be referred to as a subslot. The mini slot may include a smaller number of symbols than those of the slot. The PDSCH (or the PUSCH) to be transmitted in larger time units than that of the mini slot may be referred to as a PDSCH (PUSCH) mapping type A. The PDSCH (or the PUSCH) to be transmitted by using the mini slot may be referred to as a PDSCH (PUSCH) mapping type B.

The radio frame, the subframe, the slot, the mini slot and the symbol each indicate a time unit for conveying signals. The other corresponding names may be used for the radio frame, the subframe, the slot, the mini slot and the symbol. In addition, time units such as a frame, a subframe, a slot, a mini slot and a symbol in the present disclosure may be interchangeably read.

For example, 1 subframe may be referred to as a Transmission Time Interval (TTI), a plurality of contiguous subframes may be referred to as TTIs, or 1 slot or 1 mini slot may be referred to as a TTI. That is, at least one of the subframe and the TTI may be a subframe (1 ms) according to legacy LTE, may be a duration (e.g., 1 to 13 symbols) shorter than 1 ms or may be a duration longer than 1 ms. In addition, a unit that indicates the TTI may be referred to as a slot or a mini slot instead of a subframe.

In this regard, the TTI refers to, for example, a minimum time unit of scheduling of radio communication. For example, in the LTE system, the base station performs scheduling for allocating radio resources (a frequency bandwidth or transmission power that can be used in each user terminal) in TTI units to each user terminal. In this regard, a definition of the TTI is not limited to this.

The TTI may be a transmission time unit of a channel-coded data packet (transport block), code block or codeword, or may be a processing unit of scheduling or link adaptation. In addition, when the TTI is given, a time period (e.g., the number of symbols) in which a transport block, a code block or a codeword is actually mapped may be shorter than the TTI.

In addition, when 1 slot or 1 mini slot is referred to as a TTI, 1 or more TTIs (i.e., 1 or more slots or 1 or more mini slots) may be a minimum time unit of scheduling. Furthermore, the number of slots (the number of mini slots) that compose a minimum time unit of the scheduling may be controlled.

The TTI having the time duration of 1 ms may be referred to as a general TTI (TTIs according to LTE Rel. 8 to 12), a normal TTI, a long TTI, a general subframe, a normal subframe, a long subframe or a slot. A TTI shorter than the general TTI may be referred to as a reduced TTI, a short TTI, a partial or fractional TTI, a reduced subframe, a short subframe, a mini slot, a subslot or a slot.

In addition, the long TTI (e.g., the general TTI or the subframe) may be read as a TTI having a time duration exceeding 1 ms, and the short TTI (e.g., the reduced TTI) may be read as a TTI having a TTI length less than the TTI length of the long TTI and equal to or more than 1 ms.

A Resource Block (RB) is a resource allocation unit of the time domain and the frequency domain, and may include one or a plurality of contiguous subcarriers in the frequency domain. The numbers of subcarriers included in RBs may be the same irrespectively of a numerology, and may be, for example, 12. The numbers of subcarriers included in the RBs may be determined based on the numerology.

Furthermore, the RB may include one or a plurality of symbols in the time domain or may have the length of 1 slot, 1 mini slot, 1 subframe or 1 TTI. 1 TTI or 1 subframe may each include one or a plurality of resource blocks.

In this regard, one or a plurality of RBs may be referred to as a Physical Resource Block (PRB: Physical RB), a Sub-Carrier Group (SCG), a Resource Element Group (REG), a PRB pair or an RB pair.

Furthermore, the resource block may include one or a plurality of Resource Elements (REs). For example, 1 RE may be a radio resource domain of 1 subcarrier and 1 symbol.

A Bandwidth Part (BWP) (that may be referred to as a partial bandwidth) may mean a subset of contiguous common Resource Blocks (common RBs) for a certain numerology in a certain carrier. In this regard, the common RB may be specified by an RB index based on a common reference point of the certain carrier. A PRB may be defined based on a certain BWP, and may be numbered in the certain BWP.

The BWP may include a BWP for UL (UL BWP) and a BWP for DL (DL BWP). One or a plurality of BWPs in 1 carrier may be configured to the UE.

At least one of the configured BWPs may be active, and the UE may not assume that a given signal/channel is transmitted and received outside the active BWP. In addition, a "cell" and a "carrier" in the present disclosure may be read as a "BWP".

In this regard, structures of the above-described radio frame, subframe, slot, mini slot and symbol are only exemplary structures. For example, configurations such as the number of subframes included in a radio frame, the number of slots per subframe or radio frame, the number of mini slots included in a slot, the numbers of symbols and RBs included in a slot or a mini slot, the number of subcarriers included in an RB, the number of symbols in a TTI, a symbol length and a Cyclic Prefix (CP) length can be variously changed.

Furthermore, the information and the parameters described in the present disclosure may be expressed by using absolute values, may be expressed by using relative values with respect to given values or may be expressed by using other corresponding information. For example, a radio resource may be instructed by a given index.

Names used for parameters in the present disclosure are in no respect restrictive names. Furthermore, numerical expressions that use these parameters may be different from those explicitly disclosed in the present disclosure. Various channels (the Physical Uplink Control Channel (PUCCH) and the Physical Downlink Control Channel (PDCCH)) and information elements can be identified based on various suitable names Therefore, various names assigned to these various channels and information elements are in no respect restrictive names.

The information and the signals described in the present disclosure may be expressed by using one of various different techniques. For example, the data, the instructions, the commands, the information, the signals, the bits, the symbols and the chips mentioned in the above entire description may be expressed as voltages, currents, electromagnetic waves, magnetic fields or magnetic particles, optical fields or photons, or arbitrary combinations of these.

Furthermore, the information and the signals can be output at least one of from a higher layer to a lower layer and from the lower layer to the higher layer. The information and the signals may be input and output via a plurality of network nodes.

The input and output information and signals may be stored in a specific location (e.g., memory) or may be managed by using a management table. The information and signals to be input and output can be overridden, updated or additionally written. The output information and signals may be deleted. The input information and signals may be transmitted to other apparatuses.

Notification of information is not limited to the aspect/embodiments described in the present disclosure and may be performed by using other methods. For example, the information may be notified by a physical layer signaling (e.g., Downlink Control Information (DCI) and Uplink Control Information (UCI)), a higher layer signaling (e.g., a Radio Resource Control (RRC) signaling, broadcast information (a Master Information Block (MIB) and a System Information Block (SIB)), and a Medium Access Control (MAC) signaling), other signals or combinations of these.

In addition, the physical layer signaling may be referred to as Layer 1/Layer 2 (L1/L2) control information (L1/L2 control signal) or L1 control information (L1 control signal). Furthermore, the RRC signaling may be referred to as an RRC message, and may be, for example, an RRCConnectionSetup message or an RRCConnectionReconfiguration message. Furthermore, the MAC signaling may be notified by using, for example, an MAC Control Element (MAC CE).

Furthermore, notification of given information (e.g., notification of "being X") is not limited to explicit notification, and may be given implicitly (by, for example, not giving notification of the given information or by giving notification of another information).

Decision may be made based on a value (0 or 1) expressed as 1 bit, may be made based on a boolean expressed as true or false or may be made by comparing numerical values (by, for example, making comparison with a given value).

Irrespectively of whether software is referred to as software, firmware, middleware, a microcode or a hardware description language or is referred to as other names, the software should be widely interpreted to mean a command, a command set, a code, a code segment, a program code, a program, a subprogram, a software module, an application, a software application, a software package, a routine, a subroutine, an object, an executable file, an execution thread, a procedure or a function.

Furthermore, software, commands and information may be transmitted and received via transmission media. When, for example, the software is transmitted from websites, servers or other remote sources by using at least ones of wired techniques (e.g., coaxial cables, optical fiber cables, twisted pairs and Digital Subscriber Lines (DSLs)) and radio techniques (e.g., infrared rays and microwaves), at least ones of these wired techniques and radio techniques are included in a definition of the transmission media.

The terms "system" and "network" used in the present disclosure can be interchangeably used.

In the present disclosure, terms such as "precoding", a "precoder", a "weight (precoding weight)", "Quasi-Co-Location (QCL)", a "Transmission Configuration Indication state (TCI state)", a "spatial relation", a "spatial domain filter", "transmission power", "phase rotation", an "antenna port", an "antenna port group", a "layer", "the number of layers", a "rank", a "resource", a "beam", a "beam width", a "beam angle", an "antenna", an "antenna element" and a panel" can be interchangeably used.

In the present disclosure, terms such as a "base Station (BS)", a "radio base station", a "fixed station", a "NodeB", an "eNodeB (eNB)", a "gNodeB (gNB)", an "access point", a "Transmission Point (TP)", a "Reception Point (RP)", a "Transmission/Reception Point (TRP)", a "panel", a "cell", a "sector", a "cell group", a "carrier" and a "component carrier" can be interchangeably used. The base station is also referred to as terms such as a macro cell, a small cell, a femtocell or a picocell.

The base station can accommodate one or a plurality of (e.g., three) cells. When the base station accommodates a plurality of cells, an entire coverage area of the base station can be partitioned into a plurality of smaller areas. Each smaller area can also provide a communication service via a base station subsystem (e.g., indoor small base station (RRH: Remote Radio Head)). The term "cell" or "sector" indicates part or the entirety of the coverage area of at least one of the base station and the base station subsystem that provide a communication service in this coverage.

In the present disclosure, the terms such as "Mobile Station (MS)", "user terminal", "user apparatus (UE: User Equipment)" and "terminal" can be interchangeably used.

The mobile station is also referred to as a subscriber station, a mobile unit, a subscriber unit, a wireless unit, a remote unit, a mobile device, a wireless device, a wireless communication device, a remote device, a mobile subscriber station, an access terminal, a mobile terminal, a wireless terminal, a remote terminal, a handset, a user agent, a mobile client, a client or some other appropriate terms in some cases.

At least one of the base station and the mobile station may be referred to as a transmission apparatus, a reception apparatus or a communication apparatus. In addition, at least one of the base station and the mobile station may be a device mounted on a movable body or the movable body itself. The movable body may be a vehicle (e.g., a car or an airplane), may be a movable body (e.g., a drone or a self-driving car) that moves unmanned or may be a robot (a manned type or an unmanned type). In addition, at least one of the base station and the mobile station includes an apparatus, too, that does not necessarily move during a communication operation. For example, at least one of the base station and the mobile station may be an Internet of Things (IoT) device such as a sensor.

Furthermore, the base station in the present disclosure may be read as the user terminal. For example, each aspect/embodiment of the present disclosure may be applied to a configuration where communication between the base station and the user terminal is replaced with communication between a plurality of user terminals (that may be referred to as, for example, Device-to-Device (D2D) or Vehicle-to-Everything (V2X)). In this case, the user terminal 20 may be configured to include the functions of the above-described base station 10. Furthermore, words such as "uplink" and "downlink" may be read as a word (e.g., a "side") that matches terminal-to-terminal communication. For example, the uplink channel and the downlink channel may be read as side channels.

Similarly, the user terminal in the present disclosure may be read as the base station. In this case, the base station 10 may be configured to include the functions of the above-described user terminal 20.

In the present disclosure, operations performed by the base station are performed by an upper node of this base station depending on cases. Obviously, in a network including one or a plurality of network nodes including the base stations, various operations performed to communicate with a terminal can be performed by base stations, one or more network nodes (that are regarded as, for example, Mobility Management Entities (MMEs) or Serving-Gateways (S-GWs), yet are not limited to these) other than the base stations or a combination of these.

Each aspect/embodiment described in the present disclosure may be used alone, may be used in combination or may be switched and used when carried out. Furthermore, orders of the processing procedures, the sequences and the flow-chart according to each aspect/embodiment described in the present disclosure may be rearranged unless contradictions arise. For example, the method described in the present disclosure presents various step elements by using an exemplary order and is not limited to the presented specific order.

Each aspect/embodiment described in the present disclosure may be applied to Long Term Evolution (LTE), LTE-Advanced (LTE-A), LTE-Beyond (LTE-B), SUPER 3G, IMT-Advanced, the 4th generation mobile communication system (4G), the 5th generation mobile communication system (5G), Future Radio Access (FRA), the New Radio Access Technology (New-RAT), New Radio (NR), New radio access (NX), Future generation radio access (FX), Global System for Mobile communications (GSM) (registered trademark), CDMA2000, Ultra Mobile Broadband (UMB), IEEE 802.11 (Wi-Fi (registered trademark)), IEEE 802.16 (WiMAX (registered trademark)), IEEE 802.20, Ultra-WideBand (UWB), Bluetooth (registered trademark), systems that use other appropriate radio communication methods, or next-generation systems that are expanded based on these systems. Furthermore, a plurality of systems may be combined (e.g., a combination of LTE or LTE-A and 5G) and applied.

The phrase "based on" used in the present disclosure does not mean "based only on" unless specified otherwise. In other words, the phrase "based on" means both of "based only on" and "based at least on".

Every reference to elements that use names such as "first" and "second" used in the present disclosure does not generally limit the quantity or the order of these elements. These names can be used in the present disclosure as a convenient method for distinguishing between two or more elements. Hence, the reference to the first and second elements does not mean that only two elements can be employed or the first element should precede the second element in some way.

The term "deciding (determining)" used in the present disclosure includes diverse operations in some cases. For example, "deciding (determining)" may be regarded to "decide (determine)" judging, calculating, computing, processing, deriving, investigating, looking up, search and inquiry (e.g., looking up in a table, a database or another data structure), and ascertaining.

Furthermore, "deciding (determining)" may be regarded to "decide (determine)" receiving (e.g., receiving information), transmitting (e.g., transmitting information), input, output and accessing (e.g., accessing data in a memory).

Furthermore, "deciding (determining)" may be regarded to "decide (determine)" resolving, selecting, choosing, establishing and comparing. That is, "deciding (determining)" may be regarded to "decide (determine)" some operation.

Furthermore, "deciding (determining)" may be read as "assuming", "expecting" and "considering".

The words "connected" and "coupled" used in the present disclosure or every modification of these words can mean every direct or indirect connection or coupling between 2 or more elements, and can include that 1 or more intermediate elements exist between the two elements "connected" or "coupled" with each other. The elements may be coupled or connected physically or logically or by a combination of these physical and logical connections. For example, "connection" may be read as "access".

It can be understood in the present disclosure that, when connected, the two elements are "connected" or "coupled" with each other by using 1 or more electric wires, cables or printed electrical connection, and by using electromagnetic energy having wavelengths in radio frequency domains, microwave domains or (both of visible and invisible) light domains in some non-restrictive and non-comprehensive examples.

A sentence that "A and B are different" in the present disclosure may mean that "A and B are different from each other". In this regard, the sentence may mean that "A and B are each different from C". Words such as "separate" and "coupled" may be also interpreted in a similar way to "different".

When the words "include" and "including" and modifications of these words are used in the present disclosure, these words intend to be comprehensive similar to the word "comprising". Furthermore, the word "or" used in the present disclosure intends not to be an exclusive OR.

When, for example, translation adds articles such as a, an and the in English in the present disclosure, the present disclosure may include that nouns coming after these articles are plural.

The invention according to the present disclosure has been described in detail above. However, it is obvious for a person skilled in the art that the invention according to the present disclosure is not limited to the embodiments described in the present disclosure. The invention according to the present disclosure can be carried out as modified and changed aspects without departing from the gist and the scope of the invention defined based on the recitation of the claims. Accordingly, the description of the present disclosure is intended for exemplary explanation, and does not bring any restrictive meaning to the invention according to the present disclosure.

The invention claimed is:

1. A terminal comprising:
a receiver that receives Channel State Information (CSI) reporting configuration information which is a Radio Resource Control (RRC) information element; and
a processor that:
ignores a second RRC parameter regarding report quantity when the terminal is configured with a first RRC parameter regarding report quantity by the CSI reporting configuration information; and
performs a control to report Layer 1 Signal to Interference plus Noise Ratio (L1-SINR) when quantity for reporting L1-SINR is indicated by the first RRC parameter.

2. A radio communication method for a terminal comprising:
receiving Channel State Information (CSI) reporting configuration information which is a Radio Resource Control (RRC) information element;
ignoring a second RRC parameter regarding report quantity when the terminal is configured with a first RRC parameter regarding report quantity by the CSI reporting configuration information; and
performing a control to report Layer 1 Signal to Interference plus Noise Ratio (L1-SINR) when quantity for reporting L1-SINR is indicated by the first RRC parameter.

3. A system comprising a terminal and a base station, wherein:
the terminal comprises:
a receiver of the terminal that receives Channel State Information (CSI) reporting configuration information which is a Radio Resource Control (RRC) information element; and
a processor that:
ignores a second RRC parameter regarding report quantity when the terminal is configured with a first RRC parameter regarding report quantity by the CSI reporting configuration information; and
performs a control to report Layer 1 Signal to Interference plus Noise Ratio (L1-SINR) when quantity for reporting L1-SINR is indicated by the first RRC parameter; and
the base station comprises:
a transmitter that transmits the CSI reporting configuration information; and
a receiver of the base station that receives the L1-SINR.

* * * * *